(12) United States Patent
Halper et al.

(10) Patent No.: US 9,076,039 B2
(45) Date of Patent: Jul. 7, 2015

(54) PROBABILISTIC IDENTIFICATION OF SOLID MATERIALS IN HYPERSPECTRAL IMAGERY

(71) Applicant: The MITRE Corporation, McLean, VA (US)

(72) Inventors: Marin S. Halper, Washington, DC (US); William Basener, Earlysville, VA (US)

(73) Assignee: The MITRE Corporation, McLean, VA (US)

( * ) Notice: Subject to any disclaimer, the term of this patent is extended or adjusted under 35 U.S.C. 154(b) by 238 days.

(21) Appl. No.: 13/728,501

(22) Filed: Dec. 27, 2012

(65) Prior Publication Data

US 2014/0185864 A1      Jul. 3, 2014

(51) Int. Cl.
*G06K 9/00*   (2006.01)

(52) U.S. Cl.
CPC ................................ *G06K 9/0063* (2013.01)

(58) Field of Classification Search
None
See application file for complete search history.

(56) References Cited

U.S. PATENT DOCUMENTS

| | | | | |
|---|---|---|---|---|
| 7,259,715 B1 * | 8/2007 | Garren et al. | ................ | 342/179 |
| 8,515,716 B2 * | 8/2013 | Ingram et al. | ................ | 703/6 |
| 8,532,958 B2 * | 9/2013 | Ingram et al. | ................ | 702/181 |
| 8,625,744 B2 * | 1/2014 | Blackburn et al. | ........... | 378/210 |
| 2011/0121979 A1 * | 5/2011 | Blackburn et al. | ........... | 340/600 |
| 2012/0070033 A1 | 3/2012 | Basener | | |
| 2014/0185864 A1 * | 7/2014 | Halper et al. | ................ | 382/103 |

OTHER PUBLICATIONS

Burr et al., "Chemical Identification using Bayesian Model Selection," *Proceedings of 2002 Spring Research Conference—Section on Physical & Engineering Sciences*, 2002; 5 pages.

Burr et al., "Characterizing Clutter in the Context of Detecting Weak Gaseous Plumes in Hyperspectral Imagery," *Sensors*, vol. 6, No. 11, Nov. 23, 2006; 29 pages.

Burr et al., "Overview of Physical Models and Statistical Approaches for Weak Gaseous Plume Detection using Passive Infrared Hyperspectral Imagery," *Sensors*, vol. 6, No. 12, Dec. 6, 2006; 30 pages.

Higbee et al., "A Bayesian approach to identification of gaseous effluents in passive LWIR imagery," *Proceedings of SPIE*, vol. 7334, Apr. 13, 2009; 12 pages.

(Continued)

*Primary Examiner* — Tahmina Ansari
(74) *Attorney, Agent, or Firm* — Sterne, Kessler, Goldstein & Fox P.L.L.C.

(57) ABSTRACT

Systems, methods and computer program products, for identification of materials based on hyperspectral imagery, are disclosed. An example system comprises one or more processors, a memory, a library of spectral signatures, a receiver, a model generator, and a material identifier. The receiver module is configured to receive a first spectral signature corresponding to a region of interest contained in the hyperspectral image. The model generator is configured to create a model search space including one or more model signatures based on the spectral signatures in the library, wherein each of the one or more model signatures approximate the first spectral signature. The material identifier is a material identifier configured to calculate a probability associated with a presence or absence of a material within the first spectral signature, based on the first spectral signature and the model search space and determine the presence or absence of the material in the region of interest based on the probability.

20 Claims, 5 Drawing Sheets

(56) References Cited

OTHER PUBLICATIONS

Eismann et al., "Automated Hyperspectral Cueing for Civilian Search and Rescue," *Proceedings of the IEEE*, vol. 97, No. 12, Jun. 9, 2009; 25 pages.

Villeneuve et al., "Hyperspectral Sub-Pixel Target Identification using Least-Angle Regression," *Proceedings of SPIE*, vol. 7695, May 13, 2010; 11 pages.

Halper, "Global, local, and stochastic background modeling for target detection in mixed pixels," *Proceedings of SPIE*, vol. 7695, May 13, 2010; 13 pages.

Eismann et al., "Automated Hyperspectral Target Detection and Change Detection from an Airborne Platform: Progress and Challenges," *Geoscience and Remote Sensing Symposium (IGARSS), 2010 IEEE International*, Jul. 2010; 4 pages.

Basener, "An automated method for identification and ranking of hyperspectral target detections," *Proceedings of SPIE*, vol. 8048, May 20, 2011; 8 pages.

Basener et al., "A detection-identification process with geometric target dectection and subpixel spectral visualization," *Hyperspectral Image and Signal Processing: Evolution in Remote Sensing (Whispers), 2011 3rd Workshop on*, Jun. 6-9, 2011; 4 pages.

\* cited by examiner

FIG. 1a
FIG. 1b

| | Spectral Fit | | | | |
|---|---|---|---|---|---|
| | -1 - 0.5 | 0.5 - 0.75 | 0.75 - 0.9 | 0.9 - 0.95 | 0.95 - 1 |
| 0 - 0.5 | -1 | 0 | 0 | 0 | 0 |
| 0.5 - 0.75 | 0 | 1 | 1 | 1 | 1 |
| 0.75 - 0.9 | 0 | 1 | 2 | 2 | 2 |
| 0.9 - 0.95 | 0 | 1 | 2 | 3 | 3 |
| 0.95 - 1 | 0 | 1 | 2 | 3 | 4 |

(Probability on vertical axis)

PROBABILISTIC IDENTIFICATION OF SOLID MATERIALS IN HYPERSPECTRAL IMAGERY

BACKGROUND

1. Technical Field

This disclosure generally relates to identification of materials based on hyperspectral imagery.

2. Background

Over the past decade, there has been an increasing need to characterize and view the composition and location of materials on the Earth's surface from a geospatial perspective. This need spans a diverse set of domains, with applications relevant to mineralogy and geology, forestry and agriculture, environmental monitoring, astronomy, as well as defense and security. One technology, hyperspectral imaging, has matured significantly over the past decade and emerged with the capability to address this gap through passive remote sensing.

Hyperspectral imagers measure electromagnetic energy as a function of wavelength for a given spatial sampling distance and total area. The result can be represented as a three-dimensional cube, where each spectral slice through the cube consists of a spatial image of measured energy for a single wavelength hand. In contrast to multispectral imagers, hyperspectral imagers typically sample narrow hands of energy across a nearly continuous spectral range. This sampling results in a vector, or spectral signature, of many tens or hundreds of energy measurements for each pixel in the image. Each signature represents a physical quantity linked by the underlying physics and chemistry to a particular material or mixture of materials within the sampled pixel. By comparing the signature of an image pixel to a library of reference signatures, one may be able to assign the pixel a material label. This is the foundation of the non-literal, i.e., spectral and not spatial, exploitation of hyperspectral imagery.

One common application of hyperspectral analysis, referred to as target detection, is the detection of materials of interest that are rare in the image. The objective of target detection is to determine which pixels in a given hyperspectral image are likely to contain known target materials.

In the conventional paradigm for target detection, each pixel in the given image is assumed to belong to either a target class or a background class, and the objective is to determine to which class each pixel belongs. Conventionally, the first step in making this determination is to compare the signature of each pixel to a library of reference signatures for one or more target materials. For each comparison, a statistical goodness-of-fit score is computed in order to quantify the spectral match between the given pixel and each target signature. The score is often normalized relative to a background class using a model of the background derived from the image. A decision threshold can be applied to the scores in order to determine pixels in the image that are considered more likely to belong to the target class than to the background class. The utility of target detection is determined by the ability to identify a single decision threshold that adequately separates the distribution of target scores from the distribution of background scores.

In practice, however, the target and background distributions often overlap considerably. After applying the decision threshold, targets that score lower than the threshold are referred to as missed targets and background pixels that score higher are referred to as false alarms. All pixels that score higher than the decision threshold, including both targets and false alarms, are referred to as alarmed pixels or cues. In this context, the effectiveness of a decision threshold is determined by the number of missed targets and false alarms relative to the total number of cues.

BRIEF SUMMARY

System, method and computer program product embodiments are disclosed that overcome the deficiencies of conventional target detection based on hyperspectral imagery. In an embodiment, a computer implemented system for determining a presence or absence of a material from a hyperspectral image is disclosed. The system comprises one or more processors, a memory, a library of spectral signatures, a receiver, a model generator, and a material identifier. The receiver module is configured to receive a first spectral signature corresponding to a region of interest contained in the hyperspectral image. The model generator is configured to create a model search space including one or more model signatures based on the spectral signatures in the library, wherein each of the one or more model signatures approximate the first spectral signature. The material identifier is a material identifier configured to calculate a probability associated with a presence or absence of a material within the first spectral signature, based on the first spectral signature and the model search space and determine the presence or absence of the material in the region of interest based on the probability.

Further disclosed embodiments generate and probabilistically average across a wide set of mixture models to accurately estimate the probability that a target material is in a region of interest, as well as to enable the accurate spectral visualization of sub-pixel target materials. As such, various disclosed embodiments are able to achieve performance previously unrealized by conventional target detection algorithms, enabling the exploration of new applications and opportunities for hyperspectral imagery.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

It is to be appreciated that any additional disclosure found in the Figures is meant to be exemplary and not limiting to any of the features show in the Figures and described in the specification below.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate, that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Basic Terminology

Target detection and identification in hyperspectral imagery are enabled by the fundamental assumption that the material composition of each pixel can be readily determined. The basic formula for determining the material composition of a pixel is given by the linear mixture equation, $$y = a_1 x_1 + a_2 x_2 + \ldots + a_k x_k \quad (1)$$

where $x_i$ is the signature (i.e., a vector) for the $i^{th}$ material element in the equation and each coefficient $a_i$ is the abundance of the material.

Under ideal conditions, the abundance represents the percentage of the pixel spatially occupied by the given material. For this reason, the abundances are often assumed to be non-negative for solid materials. If the abundance of a material is significantly less than one, then the material is referred to as sub-pixel. If the abundance is close to one, then the material is referred to as full-pixel. If a material occupies multiple contiguous pixels at either the sub-pixel level, full-pixel level, or a combination thereof, the associated pixels can be grouped together to form a single region of interest, or ROI. The signatures of each pixel in the ROI can be averaged together to obtain a single signature for the ROI, thereby reducing the overall noise variance.

The signatures $x_i$ used in Equation 1 may be derived from a reference library or the hyperspectral image itself. When a signature is derived from the hyperspectral image, it is referred to as an endmember. Endmembers are often included in the linear mixture in order to represent background signatures that may not be included in the reference library.

Whitening Transform

The use of techniques such as least squares linear regression to solve the linear mixing equation in Equation 1 requires that certain assumptions be met to produce accurate estimates. In particular, these techniques may produce biased estimates when the variances associated with each spectral band are not equal or when there is significant correlation between spectral bands, as is often the case with hyperspectral imagery. In order to overcome this limitation, one can define a transformation to map the data into a new space in which the bands are of equal variance and are uncorrelated. This motivates the use of the whitening transform, which is derived in the remainder of this section.

If we denote each individual pixel signature as a column vector x and the mean across all N signatures as $$\mu = \frac{1}{N} \sum_{i=1}^{N} x_i,$$

then the covariance matrix of the image is defined as $$\sum = \frac{1}{N} \sum_{i=1}^{N} (x_i - \mu)(x_i - \mu)^T.$$

We can write the eigenvalue decomposition of the covariance matrix as $$\Sigma = PDP^{-1},$$

where P is the matrix whose columns are the unit eigenvectors $\Sigma$ of and D is the diagonal matrix whose elements are the corresponding eigenvalues ordered from largest to smallest. The first eigenvector corresponds to the largest eigenvalue and gives the direction of greatest variance in the image. The second eigenvector gives the direction of greatest variance orthogonal to the first, and so on.

The column vectors of P are called the principal components of the image, and can be scaled by the eigenvalues to create $W = PD^{-1/2}$. The whitening transform of pixel x is $$X = W^T(x - \mu),$$

which consists of mean subtraction followed by the projection onto the scaled principal components. It is straightforward to show that the resulting bands in whitened space are of zero mean, unit variance, and are uncorrelated, which is to say that they behave like white noise.

Target Detection

Target detection is a specific application of the linear mixture equation presented in Equation 1, in which each pixel is assumed to contain a linear combination of a target material, background material, and noise, $$x = \alpha t + \beta b + \epsilon.$$

where t is the target signature, b is the background signature, $\alpha$ is the target abundance, $\beta$ is the background abundance, and $\epsilon$ is noise. In this context, the objective of target detection is to determine if $\alpha$ is greater than zero.

In practice, the background is often modeled as a Gaussian probability distribution with a mean $\mu$ equal to mean of the image, and a covariance $\Sigma$ equal to the covariance of the image. Similarly, the target is often modeled as a Gaussian probability distribution with a mean equal to the corresponding target signature t and a covariance $\Sigma$ equal to the covariance of the image. Anomalous pixels are often masked from the image to calculate the more robust mean and covariance statistics (as is often done in the statistics literature).

Given the two hypotheses, $H_0$: target is absent $H_1$: target is present, statistical hypothesis testing can be used to define a detection statistic as the likelihood ratio $$\Lambda(x) = \frac{P(H_1 \mid x)}{P(H_0 \mid x)},$$

or, equivalently, any monotonic function of $\Lambda$. Assuming that the target and background are modeled as the Gaussian probability distributions defined above, and given the additional assumption that the target and background are mixed in the pixel with replacement, that is that $\beta=1-\alpha$, the likelihood ratio reduces to the Adaptive Coherence Estimator (ACE) detector, $$D_{ACE}(x) = \frac{\left[(x-\mu)^T \sum^{-1} (t-\mu)\right]^2}{\left[(x-\mu)^T \sum^{-1}(x-\mu)\right]\left[(t-\mu)^T \sum^{-1}(t-\mu)\right]}.$$

Defining X and T to be the whitened pixel and target signatures, respectively, ACE reduces to $$D_{ACE}(x) = \frac{[X \cdot T]^2}{[X \cdot T][T \cdot T]}.$$

In this form, it is clear that ACE is equivalent to $\cos^2(\theta)$ where $\theta$ is the angle between X and T. In practice, ACE can be implemented as $\cos(\theta)$ to preserve the information about the direction of the angle between X and T.

The above assumes that the background can be modeled as white noise by a single Gaussian distribution. This assumption is inconsistent with the existence of many different background materials, including highly correlated confusers, which results in a long tail that cannot exist in a Gaussian distribution. As a result, ACE can give false alarms on many common materials, most significantly on correlated confusers.

Background Filtering

Disclosed embodiments include an extension of ACE, referred to as background filtering. Background filtering can mitigate many sources of false alarms. Background filtering is implemented such that, for each pixel alarmed above an ACE score threshold to a given target, a second set of ACE scores is computed between the pixel and a reference library of known background materials. If the ACE score between the pixel and a background material is significantly higher than the ACE score between the pixel and a target material, then the pixel is un-alarmed or background filtered. In the absence of target identification, background filtering is a powerful technique for false alarm mitigation using ACE.

Target Identification

Target identification from hyperspectral imagery has been used for the identification of individual gases within large gas plumes. In this context, gas plumes are often a mixture of many gases and, therefore, every gas in the plume is sub-pixel. In this context, target identification is used to determine the likelihood of a target gas being present in the gas plume. This can be accomplished by transforming Equation 1 into whitened space to yield $$W^T(y-\mu)=a_1 W^T(x_1-\mu)+a_2 W^T(x_2-\mu)+\ldots+a_k W^T(x_k-\mu), \qquad (2)$$

and then evaluating the fit of all possible gas mixtures.

As both the number of gases in the plume as well as the number of gases in the reference library may be relatively large, Equation 2 cannot be solved by a combinatorial search over the set of all possible mixtures of gases to find the single mixture that is the best fit to the plume. Instead, a heuristic search is used to estimate the single mixture that best fits the gas plume. Search methods focusing on a single best fit model are referred to as winner-take-all approaches, as they do not directly consider the relative likelihoods between competing models. Stepwise least squares regression can be used in such a winner-take-all method. Note that in the presence of correlated signatures, winner-take-all approaches, such as stepwise least squares regression, have several known biases and limitations. However, as gas signatures are not highly correlated, often with very sharp and distinct spectral features and few confusers, these issues are insignificant for the identification of gases. For this reason, while there has been some work involving model averaging methods for gas identification, they have not proved to be significantly more accurate than the winner-take-all approach.

In contrast to gases, solids present several challenges for target identification. While gas signatures generally have narrow and distinct features, solid signatures often have relatively broad and indistinct features. In addition, while the signatures of a gas generally vary slightly and mostly as a function of temperature and pressure, the signatures of a solid material often vary significantly and as a function of many parameters, including particle size, optical thickness, weathering, and contamination. Thus, there is significantly more correlation between solid materials than between gases, as well as significantly more within-class variability associated with solid materials. For this reason, the winner-take-all approach, which is at the foundation of gas identification techniques, discussed above, is not well-suited for the identification of solid materials.

Compared to gases, research on target identification for solid materials has been relatively sparse, with a focus on the application of conventional winner-takes-all approaches and a general assumption that target detection alone may be sufficient. Initial research on the identification of solid materials focused on the ability to manually distinguish between a pair of known materials. Previous approaches, however, are unsuitable for application to detection of solid materials due to biases associated with the presence of highly correlated confusers and large within-class material variability. This is a motivation for the disclosed embodiments.

Probabilistic Identification of Solid Materials (PRISM)

System, method, and computer program product embodiments are disclosed that provide for the probabilistic identification of solid materials. In certain of such embodiments, input data includes a hyperspectral image, an ROI, and a reference library of signatures. Output data includes a metric representing the likelihood that a target material is contained in the ROI. Between those inputs and outputs exists a process for generating, evaluating, and integrating a set of hypotheses about the materials that may be contained in the ROI. In an embodiment, this approach is enabled by model averaging, a technique that maps probabilities from many mixtures of materials to individual materials to sets of materials. In an embodiment, the PRISM approach uses model averaging to estimate several statistical and physical quantities that are integrated to provide a single useful output. This section describes the techniques and technical approach that underlies PRISM.

Estimating the Probability of a Hypothesis

Suppose there are two hypotheses, $H_0$ and $H_1$, and a vector measurement y. Assume hypothesis $H_i$ is that y is a random sample drawn from a probability distribution with a mean $y_i$ given by a known linear combination of k vectors, $$y_i = a_1 x_1 + \ldots + a_k x_k.$$

The following describes the method for estimating the probabilities $P(H_i|y)$. Bayes Theorem states that $$P(H_i \mid y) = \frac{P(y \mid H_i) P(H_i)}{P(y)},$$

where $P(H_i|y)$ is the posterior probability of $H_i$ given the observation y, $P(H_i)$ is the prior probability of hypothesis $H_i$, and $P(y|H_i)$ is the likelihood of $H_i$ given the observation y.

Assuming that the prior probabilities $P(H_0)$ and $P(H_1)$ are equal, the following ratio can be readily derived from Bayes Theorem:

$$\frac{P(H_1 \mid y)}{P(H_0 \mid y)} = \frac{P(y \mid H_1)}{P(y \mid H_0)}.$$

Using the notation $l(H_i)$ for the likelihood $P(y|H_i)$, the ratio can be written as:

$$\frac{P(H_1 \mid y)}{P(H_0 \mid y)} = \frac{l(H_1)}{l(H_0)}. \tag{3}$$

If the additional assumption is made that the only possibilities are either $H_0$ is true or $H_1$, then $$P(H_0|y) = 1 - P(H_1|y).$$

Substituting this into Equation 3 and solving for $P(H_i|y)$ yields $$P(H_1 \mid y) = \frac{l(H_1)}{l(H_0) + l(H_1)}.$$

More generally, if we have hypotheses $H_0, \ldots H_Q$ with probabilities that sum to one, then applying Equation 3 yields:

$$P(H_i \mid y) = \frac{P(H_i \mid y)}{\sum_j P(H_j \mid y)} \tag{4}$$

$$= \frac{P(H_i \mid y) / P(H_0 \mid y)}{\sum_j P(H_j \mid y) / P(H_0 \mid y)}$$

$$= \frac{l(H_i) / l(H_0)}{\sum_j l(H_j) / l(H_0)}$$

$$= \frac{l(H_i)}{\sum_j l(H_j)}.$$

The likelihood $l(H_i)$ is given by a nontrivial integral. There are several different approximations to this integral. One such approximation uses the Bayesian Information Criterion (BIC) to calculate the likelihood as $$l(H_i) = e^{-\frac{1}{2} BIC(H_i)} \tag{5}$$

$$= (\sigma_i^2 / n)^{-df/2} df^{-k/2}$$

where df is the degrees of freedom or intrinsic dimensionality of the data, n is the dimension of the vector y, k is the number of vectors in the hypothesis $H_i$, and $\sigma_i^2$ is the error variance, $$\sigma_i^2 = \sum_{j=1}^{n} (y(j) - y_i(j))^2.$$

The first term in the BIC formula measures the error between $H_i$ and y. The second term of Equation 2 acts as a penalty based on the number of vectors in $H_i$. The probabilities $P(H_i|y)$ can then be obtained from y and the $y_j$ by substituting Equation 5 into Equation 4.

Estimating the Probability of a Material or Set of Materials

Assume now that y is the spectral signature of an ROI to be identified and that $\{x_1 \ldots x_N\}$ is a library of candidate reference signatures associated with materials that may be contained in the ROI. Suppose that a collection of models has been generated from the candidate signatures such that each model $M_j$ is a subset of signatures from the library with abundances that can be linearly combined to yield $y_j = a_1 x_1 + \ldots a_k x_k$. In this notation, $M_j$ refers to a model, which is a set of signatures from the library with corresponding abundances, and $y_j$ is the signature computed by summing the linear combination obtained from $M_j$. Henceforth, the notation $P(M_j)$ will be used to denote the probability $P(M_j|y)$, both to simplify notation and because all quantities will be estimated given the observation y. The collection of all models to be considered is called the model search space. As discussed above, the probability of the hypothesis that y is model $M_j$, assuming that the model search space contains all possible models, is $$P(M_j) = \frac{l(M_j)}{\sum_i l(M_i)},$$

where, $$l(M_j) = (\sigma_i^2 / n)^{-df/2} df^{-k/2}.$$

Also assume that each $x_i$ is known to either be a target signature or a non-target signature. The non-target signatures are further divided into background signatures acquired from the image as non-target endmembers, and non-target library signatures.

The quantity P is a probability density function and its domain is the model search space. For any subset S of the search space, the sum of P over all models in S is the probability that the true model is in S. Thus, for any material x, the probability that x is an element of y can be computed as the sum of probabilities of all models that contain x as an element:

$$P(x) = \sum_{M \mid x \in M} P(M). \tag{6}$$

If T is the set of all models that contain at least one target material then the probability of any target is the sum of probabilities of all models in T:

$$\text{probability of any target} = \sum_{M \in T} P(M). \tag{7}$$

Similarly, the probability of only non-target is the sum of probabilities of all models that do not contain any target materials, $$\text{probability of only non-target} = \sum_{M \notin T} P(M). \tag{8}$$

By summing over all signatures in a class, these set-based probabilities explicitly handle the within-class variability associated with both target and non-target materials.

Computing Expected Values of Error and Background

Given the model probabilities, the expected value, or average, or any quantity over the set of models can be computed. If f is any value on the model search space, then the expected value of f is:

$$E(f) = \sum_m f(M)P(M).$$

By defining the error of model $M_j$ by $\epsilon(M_j)=y-y_j$, the expected value of the error can be computed as:

$$E(\varepsilon) = \sum_M \varepsilon(M)P(M).$$

The expected value of the error is a vector estimating the portion of the ROI signature that cannot be modeled using the reference library signatures $x_1 \ldots x_N$.

The expected value of the background portion of each model can also be computed. For each model M, define the background to be the portion of the model composed of endmembers:

$$b(M) = \sum_i a_i x_i \delta_i,$$

where the indicator function $\delta_i$ equals unity if $x_i$ is an endmember and is zero otherwise, The expected value of the background is then given by the vector:

$$E(b) = \sum_M b(M)P(M). \tag{9}$$

Estimating an Unknown Material

As discussed above, the probabilities over the set of hypotheses are defined to sum to unity. This is equivalent to the assumption that the model search space contains every possible model. Given a set of reference signatures, $\{x_1, x_2, \ldots, x_N\}$, the model search space can be generated by combinatorially creating linear combinations of the reference signatures. If the model search space contains every possible model, it is defined to be complete. A reference library that generates a complete model search space is also defined to be complete.

A complete reference library of every possible material is only realizable from a theoretical perspective. Moreover, in practice, a complete library does not necessarily imply improved performance relative to an incomplete library. This due to the additional uncertainty associated with the lack of linear independence among the set of signatures in the library, particularly when the number of signatures is greater than the number of bands in the hyperspectral image. In practice, what is needed is not necessarily a complete library, but a library that appropriately approximates a complete library. In this context, this requires, at minimum, that the library includes a representative sampling of materials, both targets and non-targets, and that the library can generate at least one model that is a suitable match to the ROI.

One approach for this approximation is to directly estimate the portion of an ROI that is missing from the incomplete library and then to use that missing material to create an approximately complete library. Specifically, the unknown material u is defined to be the expected value of the error discussed above:

$$u := E(\epsilon) = y - E(y_j), \tag{10}$$

where the second equality can be verified with the following computation:

$$\begin{aligned} E(\varepsilon) &= \sum_j \varepsilon(M_j)P(M_j) \tag{11} \\ &= \sum_j (y - y_j)P(M_j) \\ &= \sum_j (yP(M_j) - y_j P(M_j)) \\ &= y - \sum_j y_j P(M_j) \\ &= y - E(y_j). \end{aligned}$$

It is to be appreciated that u is not necessarily a physically meaningful material, but rather, should be interpreted as a statistical representation of the mismatch between the model search space and y.

Spectral Visualization and Fit

For the purpose of quantifying the probability that a rare material is present in the ROI, it is preferable to use whitened data. As discussed above, whitening results in centered, uncorrelated, and equally weighted data that is more consistent with the assumptions of linear regression and model averaging. For this reason, estimates for the model, material, and set probabilities are generated in whitened space. However, when the objective is to quantify the abundance of background materials in an ROI, more accurate results are typically obtained using data in spectral space.

Suppose that the expected background in the ROI, E(b) from Equation 9, is computed using data in spectral space. Then the background suppressed signature is defined as the quantity: y−E(b).

The background suppressed signature is generated by subtracting a linear combination of image endmembers from the ROI signature. As this quantity contains an expected value derived from a set of models, there is no bias towards any individual target or non-target model.

Spectral visualization is the process of visually comparing the plot of a measured signature to known reference signatures in order to evaluate the presence or absence of physically meaningful spectral features. For a full-pixel target, simply comparing the plot of the ROI signature y to the reference signatures is sufficient. For a sub-pixel target, the visual comparison of y to the known reference signatures may be misleading. However, the visual comparison of the background suppressed signature, y−E(b), to the reference signatures allows one to accurately perform spectral visualization.

Figure 1A:
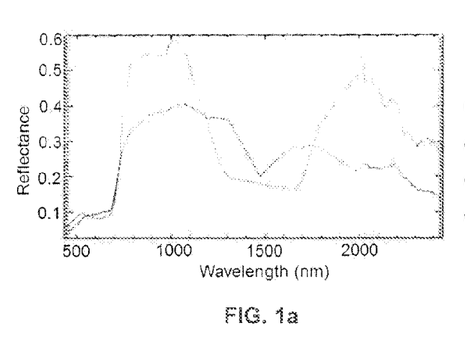
FIG. 1a is a spectral plot of retrieved reflectance, according to an embodiment.
Figure 1B:
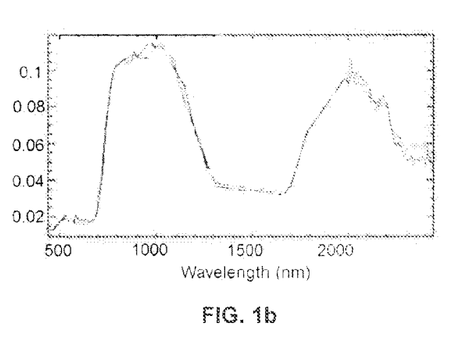
FIG. 1b is a spectral plot of background suppressed reflectance, according to an embodiment.

FIGS. 1a and 1b show examples of spectral visualization using the data described below. FIG. 1a exhibits a lack of matching features between y and the target reference signature. In contrast, FIG. 1b shows a close matching of features between y−E(b) and the target reference signature. While the plot of y, in FIG. 1a, may suggest the absence of target, the plot of y−E(b), in FIG. 1b, correctly supports the hypothesis that the target is contained in the ROI The spectral fit of a library signature $x_i$ is defined to be the $R^2$ correlation coefficient between $x_i$ and the background suppressed signature: y−E(b). No further discussion of the definition of the $R^2$ correlation coefficient will be given as this quantity is well known to those of ordinary skill in the art.

The spectral fit of a library signature represents the quantitative analog of spectral visualization using the background suppressed signature. As such, the spectral fit can be used to evaluate the presence or absence of physically meaningful spectral features. The spectral fit of any target is defined to be the largest spectral fit score between y−E(b) and a target signature $t_i$. The spectral fit of any non-target and the spectral fit of unknown material are defined similarly.

If the endmembers are selected subject to the constraint that they are uncorrelated with the target signatures, the background suppressed signature can be used to estimate the abundance of each target material in the ROI. Since the background suppressed signature is obtained by subtracting only image endmembers from y, the abundance of $t_i$ in y is the same as the abundance of $t_i$ in y−E(b). As such, the abundance can be estimated as:

$$a(t_i) = \frac{(y - E(b)) \cdot t_i}{t_i \cdot t_i}.$$

Assessing Confidence

One objective of PRISM is to assign a single confidence value to the hypothesis that the ROI contains a target. This confidence value should correspond directly to the trustworthiness of the identification results, with higher confidence values indicating greater trustworthiness. In this context, trustworthiness represents the positive predictive value or precision, and can be defined as the probability that an ROI that is declared to contain a target actually does contain a target. The metrics derived above can be integrated to estimate such a confidence value. For target identification, the probability of a given material is an informative and discriminatory metric. In addition, the spectral fit of any target provides a complimentary and relatively orthogonal metric to that probability estimate. While the probability is more statistical in nature, the spectral fit is more physical. As such, these two metrics can be integrated together to provide a powerful foundation for confidence assessment. An empirically determined guide for assessing PRISM Confidence using the probability and spectral fit is presented in FIG. 2.

Figure 2:
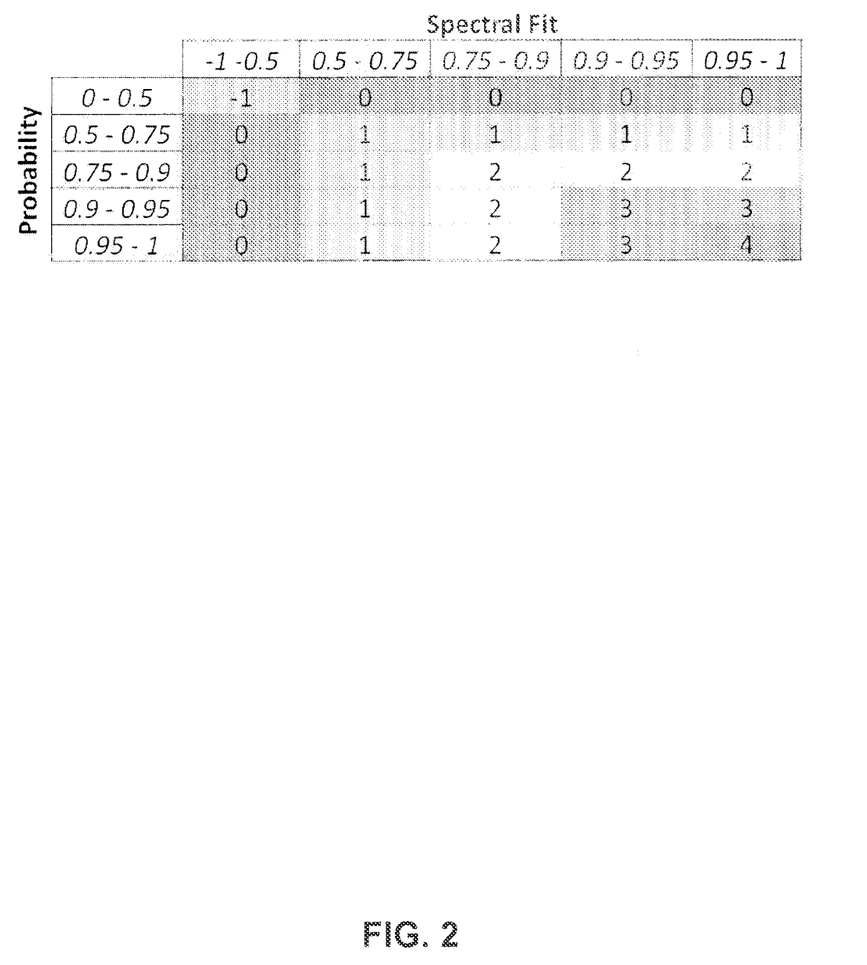
FIG. 2 illustrates confidence as a function of probability and spectral fit, according to an embodiment.

Note that the more statistically meaningful probability and the more physically meaningful spectral fit metrics are equally weighted and that PRISM Confidence increases as a function of both metrics. In this example, the values −1 to 4 correspond to the confidence qualifiers False Alarm, No Confidence, Low, Medium, High, and Very High.

After confidence assessment, each ROI in the image can be colored according to the PRISM Confidence in order to enable the geospatial interpretation of the identification results.

Figure 3:
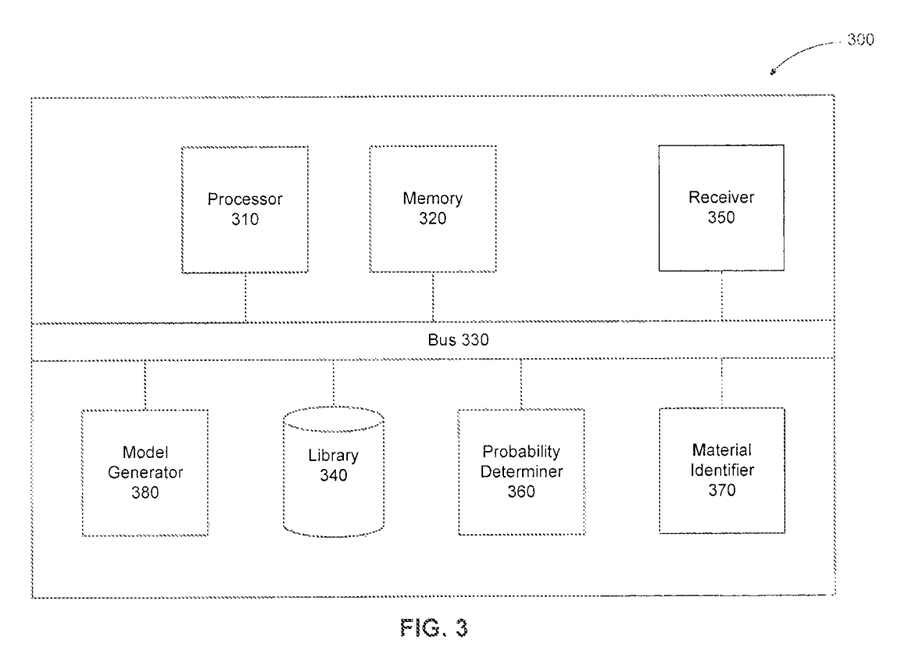
FIG. 3 is a block diagram of a system 300 for performing PRISM, according to an embodiment.

FIG. 3 is a block diagram of a system 300 for performing PRISM, according to an embodiment.

System 900 includes a processor 310, a memory 320, and a bus 330. Processor 910 may be configured to execute instructions stored within memory 320. Processor 310 may be any type of processing device capable of executing instructions. In an embodiment processor 310 may be a plurality of processors capable of executing instructions. Memory 320 may be any type of volatile or non-volatile data storage device. For example, memory 320 may be RAM, ROM, EEPROM, PROM, or any other type of data storage device. Processor 310 and memory 320 may communicate over bus 930. Bus 330 is any type of bus capable of connecting one or more devices or module together to facilitate their communication.

System 300 also includes library 340, receiver 350, probability determiner 360, material identifier 370, and model generator 380. Library 340 includes one or more spectral signatures that correspond to a material. The signatures may be collected in a number of ways. For example, the signatures may be collected from lab or field measurements or from the hyperspectral image to be analyzed for representation of local background materials, or from other hyperspectral images previously analyzed or with known materials. A spectral signature may be a vector of many tens or hundreds of energy measurements for each pixel in an image. Each signature may represent a physical quantity linked by the underlying physics and chemistry to a particular material within a particular sampled pixel. In an embodiment, library 340 may be configured as a database or other mechanism that can store one or more spectral signature. For example, library 340 may be implemented using eXtensible Markup Language (XML), one or more text files, a file system structure, serialized data structures, or any other data structure or structures that may be configured to store and return one or more spectral signatures. In particular, library 340 may be configured so that library 340 may be queried for particular characteristics that return one or more spectral signatures. For example, library 340 may be queried for to return spectral signatures that include a particular energy measurement. Library 340 may also be configured to return all of the spectral signatures contained within library 340.

In an embodiment, the signatures stored within library 340 may have one or more transformations applied. For example, a whitening transform may be applied to the spectral signatures stored within library 340. A whitening transform maps data into a new space in which the bands are of equal variance and are uncorrelated. This may improve potentially biased estimates when the variances associated with each spectral band within a signature are not equal or when there is significant correlation between spectral bands in a signature, as is often the case with hyperspectral imagery.

Receiver 350 may be configured to receive a region of interest (ROI) signature for identification. The ROI signature corresponds to a region of interest within a hyperspectral image. In an embodiment, the ROI signature may be received as a vector or data array of values. The values may correspond to measured energy within the region of interest. As discussed above, in some cases, library 340 may contain signatures that have had whitening transforms applied. In such a case, receiver 350 may be configured to apply a whitening transform to the ROI signature to create a whitened ROI signature. This may then allow for comparison between the ROI signature and the signatures of library 340.

In order to identify targets within the ROI signature, models are generated with known material signatures contained in library 340 to compare against the ROI signature. Model generator 380 is configured to generate a model search space including one or more model signatures that approximate the ROI signature. More particularly, the ROI signature may be approximated using linear combinations of a subset of signatures contained in library 340 and abundances. The abundances may be determined using a form of least squares regression, such as, non-negative least squares (NNLS) regression. For example, the ROI signature may be composed of materials A, B, and C, in varied abundances. As discussed above, the ROI signature is a mathematical representation of the combination of those materials. Thus, there may be a variety of spectral signatures in library 340 that when multiplied by various abundances and combined with other materials may have the same or approximately the same mathematical representation as the ROI signature.

However, in some cases, the models may not entirely approximate the ROI signature. For example, the ROI signature may contain material that is unknown or not contained within library 330, and thus considered an unknown material. In an embodiment, model generator 380 may be configured to calculate the amount of unknown material for the model search space. The amount of unknown material may then be used when generating each of the model signatures.

In an embodiment, the model search space may be a complete model search space, and thus, include all subsets of signatures within library 340 that may be linearly combined to yield an approximation of the ROI signature. However, in some cases, depending on the size of library 340, the number of models in the model search space may be quite large. Thus, in such cases, a complete model search space may not be feasibly created. In an embodiment, model generator 380 may be configured to create the model search space by approximating the complete model search space. More particularly, model generator 380 may begin by creating the one or more models in the model search space using single signatures from library 340 and an abundance to approximate the ROI signature. Thus, the model search space may include a number of models having a single signature and abundance that approximate the ROI signature. Model generator 380 may then continue to generate models with an increasing number of terms (i.e., a signatures and associated abundance) up to a predetermined number of terms. In an embodiment, model generator 380 may create a model search space including models of four terms or less. For example, the model search space may include all of the possible combinations of spectral signatures in library 340 that yield the ROI signature where each of the models have four terms or less. However, it is contemplated within the scope of this disclosure that any number of signatures in the subset up to a predetermined amount may be used.

System 300 also include probability determiner 360. Probability determiner 360 is configured to determine a similarity probability between a model in the model search space and the ROI signature. Probability determiner 360 may be configured to use Bayesian Information Criterion to calculate a likelihood for the model. The likelihood may then be divided by the summation of all likelihood calculated for all of the models in the model search space or approximated model search space to calculate the similarity probability.

System 300 also includes material identifier 370 for identifying whether a target material is present in the ROI signature. In an embodiment, material identifier 370 may determine the probability that the target material is present in the ROI signature by determining matching models within the model search space. In particular, since the signatures contained within library 340 are known their associated materials are also known. Accordingly, a matching model is a model that contains a spectral signature of library 340 that is of the target material. The similarity probabilities determined by probability determiner 360 for the models that contain any of the signatures that correspond to the target material may then be summed together to calculate the probability that the target exists in the ROI signature. Material identifier 370 may determine whether the target material is present in the ROI signature by determining whether the probability of whether the target material is in the ROI signature is above a threshold. Likewise, material identifier 370 may determine that the target material does not exist in the ROI signature if the probability is below a threshold.

In an embodiment, material identifier 370 may be configured to determine the probability that a target material is in the ROI signature using spectral fit with background suppression. In such a case, material identifier 370 may be further configured to determine the expected background of the ROI signature. More particularly, material identifier 370 may calculate the expected background of the ROI signature by determining for each model in the model space the expected background. The expected background of a model is calculated by summing all signatures of the model that are background materials. The expected background of the ROI signature may be calculated by summing each of the expected backgrounds of the one or more models in the model search space multiplied by its respective similarity probability calculated by probability determiner 370.

Material identifier 370 may then be further configured to calculate a background suppressed signature for the ROI signature. More particularly, material identifier 370 may be configured to subtract the expected background from the ROI signature to calculate the background suppressed ROI signature. Material identifier 370 may then be configured to use spectral fit to determine the presence or absence of a target material in the background suppressed ROI signature. For example, material identifier 370 may determine the $R^2$ correlation coefficient of the background suppressed ROI signature and a spectral signature in library 340 representing the target material. If the $R^2$ correlation coefficient is above a threshold, material identifier 370 may be configured to determine that the target material is present in the ROE signature. Likewise, if the $R^2$ correlation coefficient is below a threshold, material identifier 370 may be configured to determine that the target material is absent in the ROI signature.

Figure 4:
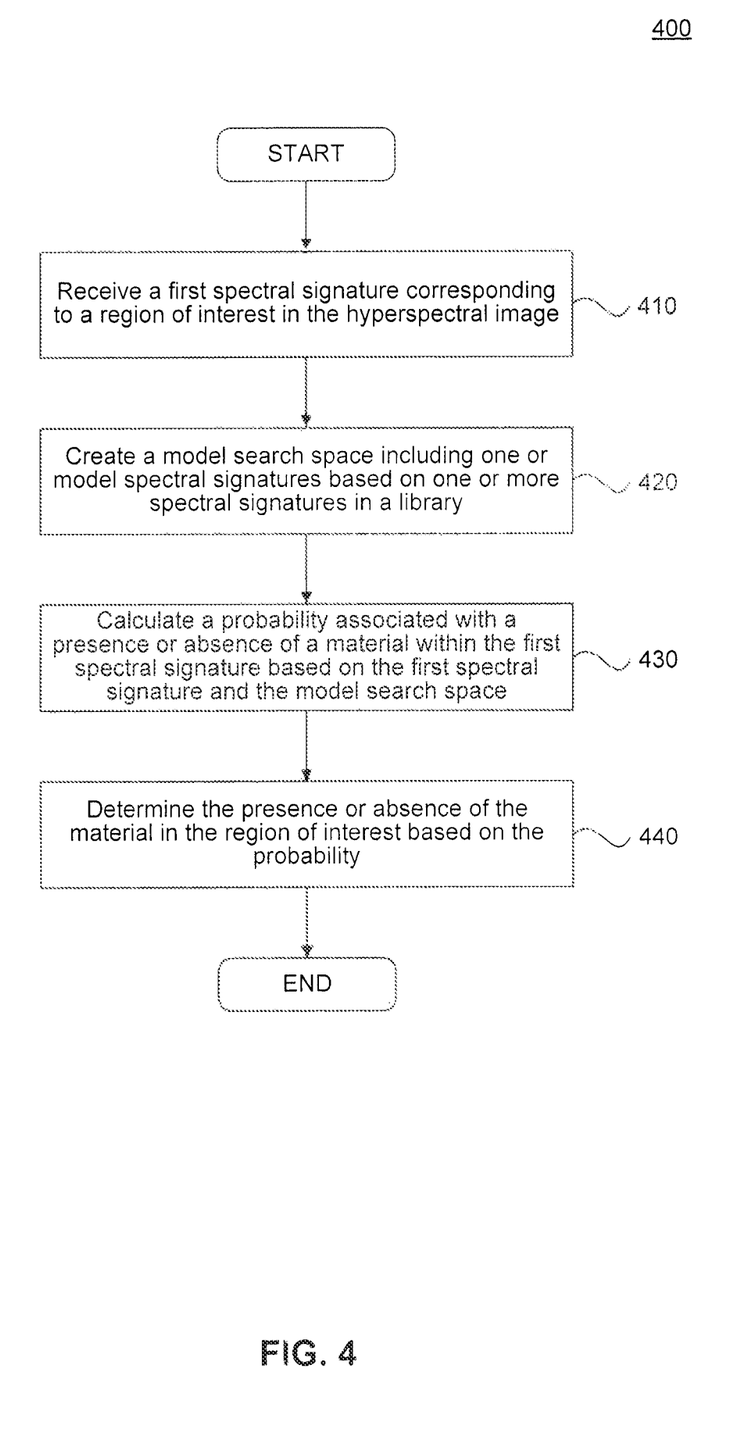
FIG. 4 is a flow diagram of a method 400 for determining a presence or absence of a material from a hyperspectral image, according to an embodiment.

FIG. 4 is a flow diagram of a method 400 for determining a presence or absence of a material from a hyperspectral image, according to an embodiment.

At block 410 of method 400, a first spectral signature is received corresponding to a region of interest contained in a hyperspectral image. In an embodiment, the first spectral signature may be received as a vector or data array or values. The values may correspond to measured energy within the region of interest in the hyperspectral image.

At block 420, a model search space is created including one or more model signatures based on one or more spectral signatures in a library of spectral signatures. The one or more spectral signatures stored within the library may each correspond to known materials or unlabeled background materials from the image. In an embodiment, the library may be configured as a database or other mechanism that can store one or more spectral signature. In particular, the library may be configured so that the library may be queried for particular characteristics that return one or more spectral signatures. For example, the library may be queried to return spectral signatures that include a particular energy measurement. The library may also be configured to return all of the spectral signatures contained within library.

In an embodiment, the signatures stored within the library may have one or more transformations applied. For example, a whitening transform may be applied to the spectral signatures stored within the library. This may improve potentially biased estimates when the variances associated with each spectral band within a signature are not equal or when there is significant correlation between spectral bands in a signature, as is often the case with hyperspectral imagery. In such cases, the first spectral signature may likewise have a whitening transform applied to permit a comparison between the first signature and the signatures of the library.

In order to identify targets within the first signature, one or more models may be created using the one or more known material spectral signatures contained in the library to compare against the first signature. More particularly, using linear combinations of a subset of signatures contained in the library and abundances, the first spectral signature may be approximated by the one or more models. The abundances may be determined using NNLS regression. In an embodiment, an amount of unknown material may also be calculated and used when generating the model search space.

In some cases, the model search space may be a complete model search space, and thus, include every subset of signatures within the library that may be linearly combined to yield an approximation of the first signature. However, in some cases, depending on the size of the library, the number of subsets that may yield the first spectral signature may be quite large. Thus, in some cases, a complete model search space may not be feasibly created. In an embodiment, the model search space may be created by approximating the complete model search space. More particularly, the search space may be created by first creating the second spectral signature and the one or more additional signatures with one term signatures and abundances to approximate the first spectral signature. The search space may then be expanded by successively generating models with an increasing number of terms (i.e., a signatures and associated abundance) up to a predetermined number of terms in the model. For example, in an embodiment, the search space may include models of four terms or less. However, it is contemplated within the scope of this disclosure that models with any number of terms up to a predetermined amount may be used.

At block 430, a probability is calculated, based on the first spectral signature and the model search space, wherein the probability indicates the probability of a presence or absence of a material or a mixture of materials within the first spectral signature. In an embodiment, the model search space may be searched to find models that include the target material. The models that include the target material may be referred to as matching models. In particular, since the signatures contained within the library are known, their associated materials are also known. Thus, a matching model includes a spectral signature from the library that is of the target material.

In order to determine the probability that the first signature contains the target material a similarity probability may be calculated for each of the matching models, according to an embodiment. The similarity probability may indicate the degree of similarity between each of the matching models and the first spectral signature. In an embodiment, likelihoods may be calculated for each model in the model search space. The likelihoods may be calculated using Bayesian Information Criterion. The similarity probability for a model may be calculated by dividing that model's respective likelihood by a summation of all likelihoods for the Model search space. The similarity probabilities for the matching models may then be summed together to calculate the probability that the target exists in the first signature.

In an embodiment, a spectral fit may also be calculated of the first signature and the target material. This may be calculated in parallel with the probability that the first signature contains the target material. The spectral fit is an orthogonal metric to the probability that the first signature contains the target material. Accordingly, the probability and the spectral fit may then be combined to yield a final confidence value of the probability that the first signature contains the target material. More particularly, an expected background signature of the first spectral signature may be calculated. The expected background signature of the first spectral signature may be calculated by determining for each of the one or more model signatures their respective expected background. The expected background of a model signature is calculated by summing all of the spectral signatures included in the model that are background materials. The expected background signature of the first spectral signature may then be calculated by summing each of the expected backgrounds of the one or more model signatures multiplied by their respective similarity probability. A background suppressed signature for the first spectral signature may then be calculated.

The background suppressed signature for the first spectral signature may be calculated by subtracting the expected background signature from the first spectral signature to calculate the background suppressed first spectral signature. The probability that the first spectral signature contains the target material may then be calculated using spectral fit. For example, the $R^2$ correlation coefficient of the background suppressed first spectral signature and a signature in the library representing the target material may be calculated indicating the probability of the spectral fit.

At block 440, a presence or absence of a material, associated with the first spectral signature, based on the probability. The presence or absence of the material may be determined based on a threshold. For example, if the probability is above a threshold, that may indicate the presence of the material. On the other hand, if the probability is below a threshold, that may indicate the absence of the material. The confidence value may also be used to determine the presence or absence of a material if spectral fit is used to calculate a confidence value.

Figure 5:
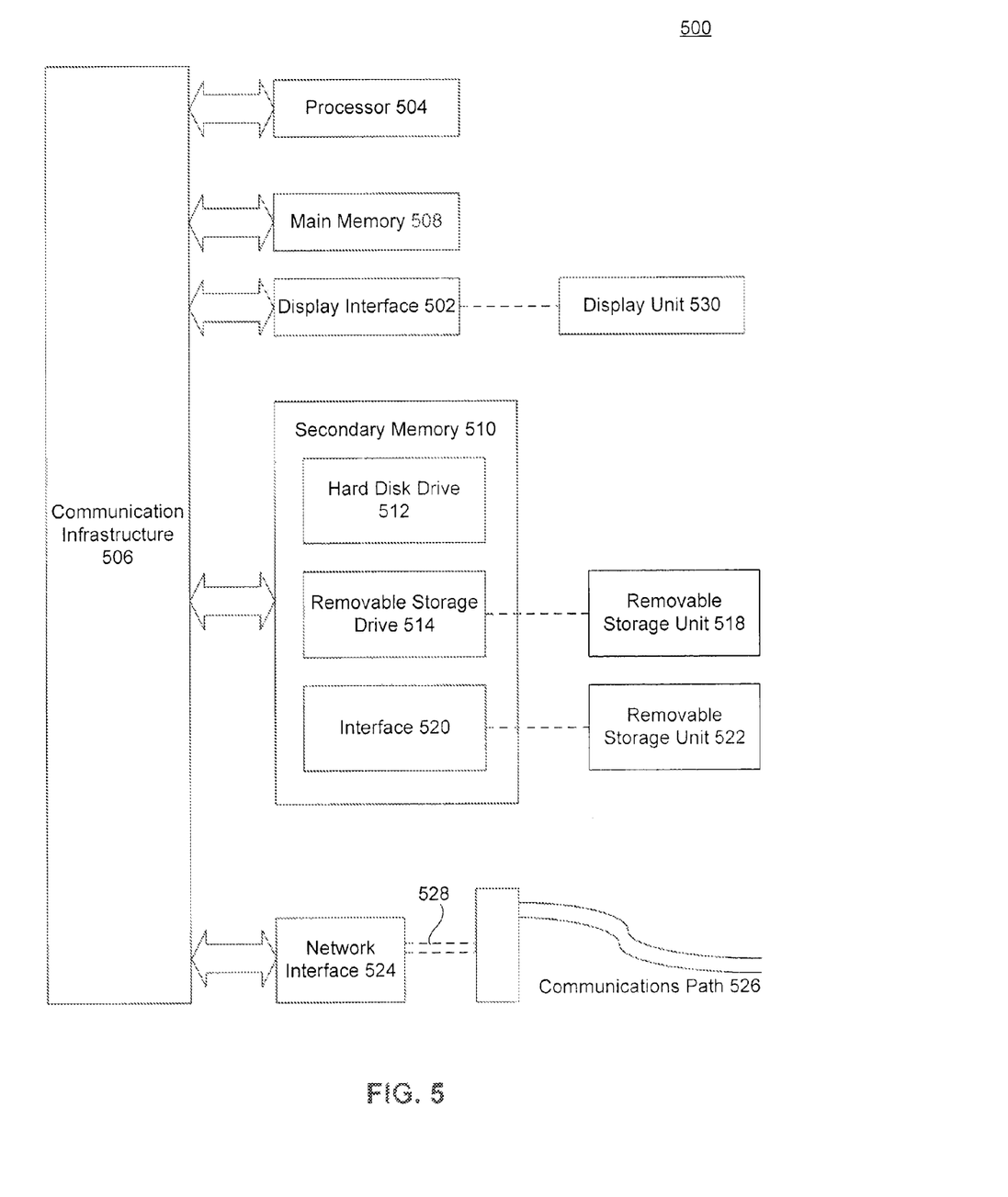
FIG. 5 is a block diagram of a processor based computing device in which embodiments of the invention may be implemented.

Embodiments of the present invention, and components thereof, can be implemented by software, firmware, hardware, or a combination thereof FIG. 5 illustrates an example computer system 500 in which the present invention, or portions thereof, can be implemented as computer-readable code. For example, method 400 or system 300 may be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. that is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals that may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Signals carried over communications path 526 can also embody the logic described herein. Computer program medium and computer usable medium can also refer to memories, such as main memory 508 and secondary memory 150, which can be memory semiconductors (e.g. DRAMs, etc.). These computer program products are means for providing software to computer system 500.

Computer programs (also called computer control logic) are stored in main memory 508 and/or secondary memory 150. Computer programs may also be received via communications interface 524. Such computer programs, when executed, enable computer system 500 to implement the present invention as discussed herein. In particular, the computer programs, when executed, enable processor 504 to implement the processes of the present invention, such as the steps in the method 400 illustrated by flowchart of FIG. 4, discussed above. Accordingly, such computer programs represent controllers of the computer system 500. Where the invention is implemented using software, the software may be stored in a computer program product and loaded into computer system 500 using removable storage drive 514, interface 520, hard drive 512 or communications interface 524.

Embodiments of the invention are also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of determining a presence of a material from a hyperspectral image, the method comprising:
    receiving a first spectral signature corresponding to a region of interest (ROI) in the hyperspectral image;
    creating a model search space including two or more models, wherein each of the two or more models corresponds to a subset of spectral signatures in a library;
    creating, for each of the two or more models, a model spectral signature based on the corresponding subset of spectral signatures, wherein each of the model spectral signatures approximates the first spectral signature;
    calculating a cumulative probability of the first spectral signature indicating a presence of a material within the ROI, wherein the cumulative probability is based on a sum of similarity probabilities of models that contain the material as an element; and determining the presence of the material in the ROI based on the cumulative probability.

2. The method of claim 1, further comprising:

calculating an amount of unknown material for the model search space; and calculating the similarity probabilities for each of the model spectral signatures using the amount of unknown material as an additional term.

3. The method of claim 1, wherein the first spectral signature was obtained from a first measured spectral signature by applying a whitening transform to the first measured spectral signature; and wherein each of the two or more models was created by applying a whitening transform to the corresponding subset of spectral signatures in the library.

4. The method of claim 1, wherein creating a model search space comprises linearly combining two or more of the spectral signatures in the library using abundances to yield a first model spectral signature.

5. The method of claim 4, wherein the two or more abundances are created using non-negative least squares regression.

6. The method of claim 4, wherein the first model spectral signature corresponds to a linear combination of spectral signatures from the library that yields the first model spectral signature up to a predetermined number of terms.

7. The method of claim 1, further comprising determining a background expected value signature of the model search space.

8. The method of claim 7, further comprising calculating a background suppressed signature by subtracting the background expected value signature from the first signature.

9. The method of claim 8, wherein determining the cumulative probability further comprises determining a spectral fit between the first spectral signature and each spectral signature of a plurality of spectral signatures from the library, wherein each of the spectral fits corresponds to a correlation coefficient between the background suppressed signature and each of the plurality of spectral signatures.

10. A non-transitory computer readable storage medium having program instructions stored thereon that, when executed by a processor, cause the processor to:

receive a first spectral signature corresponding to a region of interest (ROI) in the hyperspectral image;

create a model search space including two or more models, wherein each of the two or more models corresponds to a subset of spectral signatures in a library;

create, for each of the two or more models, a model spectral signature based on the corresponding subset of spectral signatures, wherein each of the model spectral signatures approximates the first spectral signature;

calculate a cumulative probability of the first spectral signature indicating presence of a material within the ROI, wherein the cumulative probability is based on a sum of similarity probabilities of models that contain the material as an element; and determine the presence of the material in the ROI based on the cumulative probability.

11. The computer readable storage medium of claim 10, wherein the program instructions further comprise computer readable code that causes the processor to:

calculate an amount of unknown material for the model search space; and calculate the similarity probabilities for each of the model signatures using the amount of unknown material as an additional term.

12. The computer readable storage medium of claim 10, wherein the program instructions further comprise computer readable code that causes the processor to determine a background expected value of the model search space.

13. The computer readable storage medium of claim 12, wherein the program instructions further comprise computer readable code that causes the processor to determine a spectral fit between the first spectral signature and each spectral signature of a plurality of spectral signatures from the library, wherein each of the spectral fits corresponds to a correlation coefficient between the background suppressed signature and each of the plurality of spectral signatures.

14. A system for determining a presence of a material from a hyperspectral image, the system comprising:

one or more processors;

a memory;

a library of spectral signatures including one or more spectral signatures corresponding to a material;

a receiver configured to receive a first spectral signature corresponding to a region of interest (ROI) contained in the hyperspectral image;

a model generator configured to:

create a model search space including two or more models, wherein each of the two or more models corresponds to a subset of spectral signatures in a library, and create, for each of the two or more models, a model spectral signature based on the corresponding subset of spectral signatures in the library, wherein each of the model spectral signatures approximates the first spectral signature; and a material identifier configured to:

calculate a cumulative probability of the first spectral signature indicating a presence of a material within the ROI, wherein the cumulative probability is based on a sum of similarity probabilities of models that contain the material as an element, and determine the presence of the material in the ROI based on the cumulative probability.

15. The system of claim 14, further comprising a probability determiner configured to:

calculate an amount of unknown material for the model search space; and calculate the similarity probabilities for each of the model spectral signatures using the amount of unknown material as an additional term.

16. The system of claim 14, wherein the probability determiner is further configured to determine a background expected value associated with the model search space.

17. The system of claim 16, wherein the material identifier is further configured to determine a spectral fit between the first spectral signature and each spectral signature of a plurality of spectral signatures from the library, wherein each of the spectral fits corresponds to a correlation coefficient between the background suppressed signature and each of the plurality of spectral signatures.

18. The method of claim 1, further comprising determining an expected value of an error of a model in the model search space.

19. The method of claim 1, further comprising determining an expected value of a background portion of a model in the model search space.

20. The method of claim 1, further comprising estimating a mismatch between the model search space and the first spectral signature.

* * * * *